United States Patent [19]

Schmidt

[11] Patent Number: 4,501,888

[45] Date of Patent: Feb. 26, 1985

[54] PROCESS FOR PRODUCING ESTERS OF CARBOHYDRATE MATERIALS

[75] Inventor: James C. Schmidt, Champaign, Ill.

[73] Assignee: A. E. Staley Manufacturing Company, Decatur, Ill.

[21] Appl. No.: 573,789

[22] Filed: Jan. 24, 1984

[51] Int. Cl.³ .............................................. C08B 31/04
[52] U.S. Cl. .................................... 536/110; 536/107
[58] Field of Search ...................... 536/110, 69, 72, 83

[56] References Cited

U.S. PATENT DOCUMENTS

| | | | |
|---|---|---|---|
| 1,943,176 | 1/1934 | Graenacher | 536/72 |
| 2,140,346 | 12/1938 | Bley | 536/69 |
| 2,399,455 | 4/1946 | Treadway | 536/110 |
| 2,412,213 | 12/1946 | Groen | 536/110 |
| 4,060,506 | 11/1977 | Verbanac | 536/50 |

FOREIGN PATENT DOCUMENTS 374327  6/1973  U.S.S.R. ............................. 536/83

OTHER PUBLICATIONS

Starch: Chemistry and Technology, Whistler, vol. II, pp. 376-380, 1967, Academic Press, New York, N.Y.
Chemistry and Industry of Starch, R. W. Kerr, 2nd Ed., pp. 262-293, 1950, Academic Press, New York, N.Y.
Chem. Commun., Iverson, vol. 5, 31 p., 1979, "Synthesis and Partial O-Substitution Studies of Some Carbohydrates".
J. Chromatographer, Arbin et al., vol. 170(1), pp. 25-33, Elsevier Scientific Publishing Company, Netherlands, "Alkylation of Carboxylic Acids by Solid-Liquid Phase-Transfer Catalysis for Determination by Gas Chromatography".
Pol. J. Chem., Szeja, vol. 54(6), pp. 1301-1304, 1980, "Acylation of Carbohydrates in the Catalytic Two--Phase System".
Pol. J. Chem., Szeja, vol. 54(6), pp. 1323-1325, 1980, "Selective Esterification of Primary Hydrolyl Groups in Sugars in a Catalytic Two-Phase System".

*Primary Examiner*—Ronald W. Griffin
*Attorney, Agent, or Firm*—Forrest L. Collins; Philip L. Bateman; James B. Guffey

[57] ABSTRACT

This invention describes a process for acetylating (esterifying) starches including dispersing the starch in an organic acid; contacting the starch with an organic acid anhydride; and reacting the components in the presence of a quaternary ammonium halide.

17 Claims, No Drawings

PROCESS FOR PRODUCING ESTERS OF CARBOHYDRATE MATERIALS

BACKGROUND OF THE INVENTION

1. Field of the Invention

The present invention relates to forming esters of carbohydrate materials.

2. Description of the Art Practices

It is desirable to form organic solvent-dispersible carbohydrates which have been esterified. Specifically, materials such as starch may be esterified, however, present routes are difficult to follow and therefore reduce the practicality of manufacturing such products.

It is suggested that the reader consult U.S. Pat. No. 4,060,506, Verbanac, issued Nov. 29, 1977, for a general discussion of water-dispersible, cross-linkable starches. The general preparation of starch acetates using acetic acid or acetic anhydride is described in Whistler *Starch: Chemistry and Technology*, Vol. II, Academic Press, New York, 1967, pp. 376-380. It is also suggested that R. W. Kerr, *Chemistry and Industry of Starch*, Second Ed., Academic Press, New York, 1950, pp. 262-293, be reviewed for its disclosures of starch esters.

It is desired that a starch not be fully esterified as the ester is quite stable. That is, the hydroxyl groups on the starch molecule will not be free, and a fully esterified starch is not useful in preparing reactive coatings. While the starch molecule could be esterified to a degree of substitution of 3 corresponding to each of the hydroxyl groups on the glucoside unit, such is not done. The term "glucoside" refers to the individual six-membered ring component within the starch (polymer) which has 3 hydroxyl groups available for esterification. It is desirable that the degree of substitution be less than 3 so that the starch will retain an active hydroxyl site for chemical reactions.

The use of perchloric acid or sulfuric acid as a catalyst to form starch esters is described in U.S. Pat. No. 2,399,455 issued Apr. 30, 1946 to Treadway. The use of phase transfer catalysis in the treatment of monosaccharides is described in an article by Iverson, found in *Chem. Commun.* 1979, Vol. 5. The alkylation of carboxylic acids by solid-liquid phase transfer catalysis for determination by gas chromatography is described by Arbin et al. in the *J. Chromatogr.*, 1979, Vol 170(1), pp. 25-33.

The acylation of carbohydrates in a catalytic 2-phase system is described in an article by Szeja, *Pol. J. Chem.* 1980, Vol. 54(6), pp. 1301-4. The selective esterification of primary hydroxyl groups in sugars in a catalytic 2-phase system is further described in an article by Szeja at *Pol. J. Chem.* 1980, Vol. 54(6), pp. 1323-5.

To the extent that the foregoing is applicable to the present invention, the references are incorporated herein by reference. Throughout the specification and claims, percentages and ratios are by weight, pressures are in atmospheres, and temperatures are degrees Celsius unless otherwise indicated.

SUMMARY OF THE INVENTION

The present invention describes a process for esterifying a starch including the steps of: (a) dispersing a starch in an organic acid; (b) contacting the starch with an organic acid anhydride; and, (c) reacting the starch and the organic acid anhydride in the presence of a quaternary ammonium halide, thereby obtaining the esterified starch product.

DETAILED DESCRIPTION OF THE INVENTION

The starch esters of the present invention are prepared as previously indicated by dispersing the starch in an organic acid.

Suitable starches herein are preferably waxy maize, dent corn or high amylose corn starch or mixtures thereof. However, other starches (or starch mixtures) such as tapioca, wheat, potato and other similar starches may be prepared. The starch should not be gelatinized prior to conducting the reaction as this aggravates the processing conditions required to obtain the starch ester. Therefore, a starch may be obtained in a slurry prior to gelatinization and the remainder of the reaction conducted as described herein.

The organic acid employed in the present invention may be the same or different than that which is obtained by hydrolysis of the organic acid anhydride utilized herein. It is most preferential to utilize acetic anhydride in combination with acetic acid. It is preferred that the organic acid anhydride have the same organic acid root as the organic acid. It is, however, possible to utilize other organic acids which do not correspond to the anhydride. Such conditions are, however, likely to result in a mixture of esters of the starch rather than a single ester as is obtained when the acid and the acid anhydride have the same root. Suitable acids (and anhydrides) include acetic, 1-propanoic, 1-butanoic, 2-propanoic, 2-butanoic, and the like.

As an organic acid anhydride is utilized in the present invention, it is preferred that the organic acid contain as little water as possible so that the anhydride is not converted to the acid form. Thus, when acetic acid anhydride is utilized in the present reaction, the acetic acid should be glacial. It is also noted at this point that no other sources of water beyond trace amounts should be present in the reaction mixture as such will lessen the organic acid anhydride available for esterifying the starch. The reaction conditions during the esterification should be essentially anhydrous. However, moisture may be retained in the starch as long as additional anhydride sufficient to react with the moisture is employed.

The amount of organic acid employed in the present invention is any convenient amount which is sufficient to result in the starch being dispersed within the system. It may be conveniently stated that the weight ratio of the organic acid to the starch should be from about 10:1 to about 1:2; most preferably from about 5:1 to about 1:1. The acid may be generated in situ from the anhydride, however, this is not favored due to the cost of the anhydride.

The amount of organic acid anhydride employed in the present invention will be proportionate to the degree of substitution (D.S.) which is desired for the formation of the starch ester. As previously noted, the total number of hydroxyl groups available on the starch molecule for esterification is 3. While it is possible within the scope of the present invention to achieve a fully esterified starch, it is often desirable to leave at least one of the hydroxyl groups free (unesterified) on the glucoside backbone so that further reactions may be conducted. The amount of organic acid anhydride employed will be at least one mole of the anhydride for each hydroxyl group desired to be substituted onto the glucoside backbone.

In the preferred aspects of the present invention, the degree of substitution and hence the amount of organic acid anhydride employed in the reaction should give a degree of substitution of from 1:5 to 2.9; preferably from about 2.0 to about 2.6.

The quaternary ammonium halide utilized may be present in catalytic quantities. The amount of the quaternary ammonium halide is in contrast to that required for phase transfer catalysis where large amounts are required to effect the reaction. There is no known upper limit to the amount of quaternary ammonium halide which may be utilized in the present invention; economics do dictate that the amount be minimized. The advantages in using small amounts of quaternary ammonium halide include control of the reaction and avoiding separation of large amounts of the quaternary ammonium halide from the product.

The quaternary ammonium halide preferably has the formula $R_1R_2R_3R_4N[X]$ wherein $R_1$, $R_2$, $R_3$ and $R_4$ are organic moieties and $R_1$ to $R_4$ contain at least 12 carbon atoms, preferably 12 to 40 total, $R_1$ through $R_4$ being from 1 to 20, preferably 1 to 18 carbon atoms each. X represents the halide in the structure. Compounds desirably utilized in accordance herewith and meeting the above formula include dimethyl ditallow ammonium chloride, tetrabutylammonium chloride, hexadecyldimethylbenzyl ammonium chloride, hexadecyltrimethyl ammonium bromide or chloride, hexadecylpyridium chloride and the like. While any halide including bromide, chloride and iodide may be utilized as the anion for the quaternary compound, it is preferred that chlorides and bromides be utilized. The amount of quaternary to the starch (on a d.s.b.) is conveniently 0.1 to 10%, preferably 0.5 to 5% by weight.

The reaction is conveniently conducted by purging a closed reaction vessel with a dry inert gas such as nitrogen. The required components are added without any specific order of addition being required. The reaction mixture is heated to about 50° C. to about 150° C.; preferably from about 90° C. to about 130° C.

The reaction is conducted at or near reflux for from about 1 to about 10 hours. At lower temperatures, the reaction time is extended to obtain the same degree of substitution. Following the reaction, the mixture is allowed to cool.

Thereafter, the product of the present invention may be separated from the remaining components by adding the product to a large volume of water. The water has the dual effect of eliminating any organic acid anhydride remaining in the reaction mixture which would otherwise present a problem in disposal of the reactants. The product may then be filtered and washed with additional volumes of water. The amount of water required to effect separation of the starch ester is from about 35:1 to about 5:1; preferably from about 15:1 to about 10:1.

Sufficiently esterified products are observed to have a lower reduced viscosity when compared to the starting starch and to have solubility in acetone, methylethylketone, dimethylsulfoxide, N-methylpyrrolidone, N-vinylpyrrolidone, dichloromethane, ethyl acetate, ethylene glycol monomethylether, vinyl acetate, methylmethacrylate and acrylonitrile. The products herein are observed to be insoluble in ethylene glycol, ethanol, isopropanol, hexane and water.

The following is a suggested exemplification of the present invention.

EXAMPLE I

An enclosed reaction flask is purged with nitrogen gas for one-half hour.

Dent corn starch in the amount of 442.2 parts is combined in the reaction flask with 1040 parts of acetic anhydride and 519 parts of glacial acetic acid. Thereafter, 6.8 parts of hexadecyltrimethylammonium bromide is added to the reaction mixture. The starch initially has a moisture content of 9.54%.

The reaction vessel is heated with a hot bath at a temperature of about 130° to 135° C. and the mixture is brought to reflux with stirring. The hot bath is then removed and the reaction is allowed to reflux slowly for a few minutes to allow for any exotherm. Heating is then continued for a total of 3 hours at a mixture temperature of 118° to 124° C.

During the heating period, it is noted that the starch has swelled and dissolved to form a clear yellow solution. The reaction mixture is then cooled in air to 90° C. and then further cooled at 0° C. until the reaction mixture is brought to a temperature of about 35° C.

Thereafter, the reaction mixture is poured into 10,000 parts of rapidly stirred water. The addition to water is over a 30-minute period and stirring is continued for an additional 5 minutes after the last product is added.

The aqueous mixture is then allowed to stand overnight and the coarsely powdered starch is filtered and washed four times with 1000 parts of deionized water in each case.

The resulting starch acetate is air-dried, and then heat-dried at 50° C. to a constant weight of 628 parts (on a dry solids basis). The moisture content of the dried starch acetate is 1.84%.

The product is determined to contain 39.1% acetyl (2.38 D.S.) groups and has a reduced viscosity of 0.27 d.l./g. The product is observed to have the solubility characteristics as previously described herein.

The above reaction may be conducted utilizing a waxy maize starch. Further variations of the present invention allow the use of tetrabutylammonium chloride, octadecyltrimethylammonium bromide, dodecyltrimethylammonium chloride and the like with similar results.

What is claimed is:

1. A process for esterifying a starch including the steps of:
    (a) dispersing a starch in an organic acid;
    (b) contacting the starch with an organic acid anhydride; and,
    (c) reacting the starch and the organic acid anhydride in the presence of a quaternary ammonium halide, thereby obtaining the esterified starch product.

2. The process of claim 1 wherein the quaternary ammonium halide is selected from the group consisting of chlorides, bromides and iodides and mixtures thereof.

3. The process of claim 1 wherein the starch is selected from the group consisting of waxy maize, dent corn, and high amylose starches and mixtures thereof.

4. The process of claim 3 wherein the starch is dent corn starch.

5. The process of claim 1 wherein the organic acid is acetic acid.

6. The process of claim 5 wherein the organic acid anhydride is acetic anhydride.

7. The process of claim 1 conducted under essentially anhydrous conditions.

8. The process of claim 1 wherein the organic acid anhydride is acetic anhydride.

9. The process of claim 1 wherein the reaction is conducted at from about 50° C. to about 150° C.

10. The process of claim 1 wherein the quaternary ammonium halide is of the formula $R_1R_2R_3R_4N[X]$ wherein $R_1$, $R_2$, $R_3$ and $R_4$ contain at least 12 carbon atoms total with $R_1$ through $R_4$ each being from 1 to 20 carbon atoms.

11. The process of claim 10 wherein $R_1$ through $R_4$ contain from about 1 to about 18 carbon atoms each.

12. The process of claim 1 containing the additional step of introducing water to the mixture of organic acid and the esterified starch thereby effecting separation of the esterified starch from the organic acid.

13. The process of claim 1 wherein the weight ratio of the organic acid to the starch is from about 10:1 to about 1:2.

14. The process of claim 1 wherein the starch is esterified to a degree of substitution (D.S.) of from about 1.5 to about 2.9.

15. The process of claim 1 wherein the quaternary ammonium halide is hexadecyltrimethylammonium bromide.

16. The process of claim 1 wherein the quaternary ammonium halide is hexadecyltrimethylammonium chloride.

17. The process of claim 1 wherein the starch is ungelatinized.

* * * * *